US008224261B2

(12) United States Patent
Keerthi

(10) Patent No.: US 8,224,261 B2

(45) Date of Patent: Jul. 17, 2012

(54) CREATION OF A BEAM USING ANTENNAS

(76) Inventor: Arvind Vijay Keerthi, Karnataka (IN)

( * ) Notice: Subject to any disclaimer, the term of this patent is extended or adjusted under 35 U.S.C. 154(b) by 325 days.

(21) Appl. No.: 12/620,110

(22) Filed: Nov. 17, 2009

(65) Prior Publication Data

US 2011/0045768 A1 Feb. 24, 2011

(30) Foreign Application Priority Data

Aug. 24, 2009 (IN) .......................... 2016/CHE/2009

(51) Int. Cl.
*H04B 7/185* (2006.01)
*H04B 1/40* (2006.01)
*H04B 17/00* (2006.01)

(52) U.S. Cl. ...................................... 455/88; 455/67.11

(58) Field of Classification Search ............... 455/67.11, 455/140, 63.1, 39, 129, 334, 503, 427, 452.1, 455/12.1, 77, 9, 88, 63.4, 3.02, 67, 12, 13.1, 455/428, 561; 342/179, 14, 13.2, 562.1
See application file for complete search history.

(56) References Cited

U.S. PATENT DOCUMENTS

| | | | | |
|---|---|---|---|---|
| 2005/0134404 | A1* | 6/2005 | Kajiya | 333/156 |
| 2006/0083293 | A1* | 4/2006 | Keegan et al. | 375/148 |
| 2010/0109944 | A1* | 5/2010 | Whitehead et al. | 342/357.03 |
| 2010/0130221 | A1* | 5/2010 | Imamura | 455/452.1 |

OTHER PUBLICATIONS

Forenza et al., "Benefit of Pattern Diversity via Two-Element Array of Circular Patch Antennas in Indoor Clustered MIMO Channels", IEEE Transactions on Communications, May 2006, vol. 54, No. 5, pp. 943-954.
Sanayei et al., "Antenna Selection in MIMO Systems", IEEE Communications Magazine, IEEE, Oct. 2004, vol. 42, Issue 10, pp. 68-73.
Molisch et al., "MIMO Systems with Antenna Selection—An Overview", Mitsubishi Electric Research Labs, Mar. 18, 2004, pp. 1-6.
"MIMO Smart Antennas are Key to 4G Mobile Broadband Adoption", Oct. 24, 2007, pp. 1-2, obtained from url:<http://www.3g.co.uk/Pr/Oct2007/5336.htm>.
Shaver, "Broadband and 4G Communications—Architectures", Texas Instruments DSPS R&D Center, Communications Systems Laboratory, May 2004, Texas Instruments Technology, Dallas Texas, pp. 1-15.

* cited by examiner

*Primary Examiner* — Nay A Maung
*Assistant Examiner* — Cindy Trandai
(74) *Attorney, Agent, or Firm* — Maschoff Gilmore & Israelsen

(57) ABSTRACT

Method and apparatus for creating a pencil beam using a plurality of small diameter dish antennas. A plurality of small diameter dish antennas are spatially arranged and driven by varying electronic signals in such a way that the plurality of small diameter dish antennas co-operatively produce a pencil beam in the direction of a distant object.

18 Claims, 6 Drawing Sheets

120

600

CREATION OF A BEAM USING ANTENNAS

CROSS-REFERENCE TO RELATED APPLICATION

The present application claims the benefit of Indian Patent Application No. 2016/CHE/2009, filed Aug. 24, 2009, which is hereby incorporated by reference in its entirety.

BACKGROUND

In principle it is possible to achieve a narrow beamwidth from a plurality of dish antennas having transmitted signals that are co-phased, if the relative phases between the antennas are known and appropriate phase correction/adjustment for the phase differences between the antennas is applied along the transmit path of each antenna. However, when the antennas are spread over tens-to-hundreds of meters it becomes difficult to properly estimate their relative phases due to unknown cable lengths and differing phase responses of the components comprising the transmit chain of each antenna (e.g., encoder, modulator, up-converter, amplifier, antenna, and/or other components traversed by a signal being transmitted). Past methods to co-phase the signals have relied upon exhaustively trying every possible phase adjustment until maximum signal-to-noise ratio is attained. But this method may take unacceptably long time when many (e.g., 10 to 100, or more) antennas are involved because by the time proper phases for all the antennas are determined, the information is already old or out-dated (say, for example, because the object they are communicating with may have moved). Also, depending on the granularity of the exhaustive search in phase-space (i.e., distance between consecutive values of phases utilized to search for phase corrections), a set of phase corrections obtained may be erroneous, thereby broadening the beam produced by the antenna array, or worse, pointing the beam away from the target object. Further, the phase changes suffered by a signal traveling down a receive chain of an antenna (comprising, for example, antenna, low-noise amplifier, down-convertor, demodulator, decoder, and/or other components traversed by a signal being received) may be different from the phase changes suffered by a signal traveling up the transmit chain of the same antenna. This may be the case if cable lengths along the transmit and receive chains are different. Due to this problem, methods that apply to the transmit chain phase corrections that are estimated using signals received along the receive chain of the same antenna are wholly inapplicable.

SUMMARY

An embodiment relates to a transceiver, comprising at least one antenna element configured to receive an aggregate signal comprising one of more pilot signals; and a processor configured to compute a time delay experienced by at least one of the one or more pilot signals to provide a time delay estimate, and compute a phase rotation experienced by at least one of the one or more pilot signals to provide a phase estimate.

The at least one antenna element of the transceiver may be further configured to transmit the time delay estimate and the phase estimate to a narrow-beam phased antenna array, wherein the one or more pilot signals are transmitted to the transceiver by the narrow-beam phased antenna array.

The time delay for at least one of the one or more pilot signals may be computed by the following formula:

$$\tau_i = \arg\max C_i(\tau)$$

wherein $\tau_i$ is the time delay estimate for an $i^{th}$ pilot signal, and $C_i(\tau)$ is defined as $C_i(\tau)=|\int r(t)s_i^*(t-\tau)dt|^2$, for $0<\tau<T$., wherein r(t) is the aggregate signal, $s_i^*(t-\tau)$ is a conjugate of the $i^{th}$ pilot signal delayed by $\tau$, and $\tau$ is a delay hypothesis.

The phase rotation for at least one of the one or more pilot signals may be computed by the following formula:

$$\phi_i = \measuredangle \int r(t)s_i^*(t-\tau_i)dt.$$

wherein $\phi_i$ is the phase estimate for an $i^{th}$ pilot signal, r(t) is the aggregate signal, $s_i^*(t-\tau_i)$ is a conjugate of the $i^{th}$ pilot signal delayed by $\tau_i$, and $\tau_i$ is the time delay estimate.

An embodiment relates to a narrow-beam phased antenna array, comprising a plurality of antennas, at least one of the plurality of antennas configured to transmit one or more pilot signals, at least a portion of the antennas comprising parabolic reflectors; wherein, at least one antenna of the plurality of antennas is configured to receive a time delay estimate defining a time delay experienced by at least one of the one or more pilot signals transmitted by the at least one antenna, and a phase estimate defining a phase rotation experienced by at least one of the one or more pilot signals transmitted by the at least one antenna; and wherein, the at least one antenna is configured to transmit an information modulated signal that is shifted in time by the time delay estimate and phase rotated by the phase estimate.

The narrow-beam phased antenna array may further comprise a modulator associated with the at least one of the plurality of antennas, wherein the modulator is configured to generate the information modulated signal that is shifted in time by the time delay estimate and phase rotated by the phase estimate.

The narrow-beam phased antenna array may further comprise a switching controller coupled to at least one of the plurality of antennas, the switching controller configured to selectively activate or de-activate the antennas.

The narrow-beam phased antenna array may further comprise each of the plurality of antennas configured to receive a time delay estimate defining a time delay experienced by each of the one or more pilot signals transmitted by each corresponding antenna, and a phase estimate defining a phase rotation experienced by each of the one or more pilot signals transmitted by each corresponding antenna; and each of the plurality of antennas configured to transmit an information modulated signal that is shifted in time by the time delay estimate for each corresponding antenna and phase rotated by the phase estimate for each corresponding antenna.

The information modulated signal transmitted by the plurality of antennas may combine to form a beam.

An embodiment relates to a method, comprising receiving an aggregate signal comprising one of more pilot signals; computing a time delay experienced by at least one of the one or more pilot signals to provide a time delay estimate; and computing a phase rotation experienced by at least one of the one or more pilot signals to provide a phase estimate.

The method may further comprise transmitting the time delay estimate and the phase estimate to a narrow-beam phased antenna array, wherein the one or more pilot signals are transmitted to a transceiver by the narrow-beam phased antenna array.

The time delay for at least one of the one or more pilot signals may be computed by the following formula:

$$\tau_i = \arg\max C_i(\tau)$$

wherein $\tau_i$ is the time delay estimate for an $i^{th}$ pilot signal, and $C_i(\tau)$ is defined as $C_i(\tau)=|\int r(t)s_i^*(t-\tau)dt|^2$, for $0<\tau<T$., wherein r(t) is the aggregate signal, $s_i^*(t-\tau)$ is a conjugate of the $i^{th}$ pilot signal delayed by $\tau$, and $\tau$ is a delay hypothesis.

The phase rotation for at least one of the one or more pilot signals may be computed by the following formula:

$$\phi_i = \measuredangle \int r(t) s_i^*(t-\tau_i)dt.$$

wherein $\phi_i$ is the phase estimate for an $i^{th}$ pilot signal, r(t) is the aggregate signal, $s_i^*(t-\tau_i)$ is a conjugate of the $i^{th}$ pilot signal delayed by $\tau_i$, and $\tau_i$ is the time delay estimate.

An embodiment relates to a method, comprising transmitting one or more pilot signals by at least one of a plurality of antennas in a narrow-beam phased antenna array; receiving, by at least one antenna of the plurality of antennas, a time delay estimate defining a time delay experienced by at least one of the one or more pilot signals transmitted by the at least one antenna; receiving, by the at least one antenna, a phase estimate defining a phase rotation experienced by at least one of the one or more pilot signals transmitted by the at least one antenna; and transmitting, by the at least one antenna, an information modulated signal that is shifted in time by the time delay estimate and phase rotated by the phase estimate.

The method may further comprise transmitting, an information modulated signal for each of the plurality of antennas, wherein the information signal is shifted in time by the time delay estimate for each corresponding antenna and phase rotated by the phase estimate for each corresponding antenna, and wherein the information modulated signal transmitted by each of the plurality of antennas combines to form a beam, wherein a time delay estimate and a phase estimate is received by each of the plurality of antennas.

An embodiment relates to a computer-readable tangible medium comprising computer-executable instructions for computing a time delay experienced by at least one of one or more pilot signals to provide a time delay estimate; and computing a phase rotation experienced by at least one of the one or more pilot signals to provide a phase estimate, wherein the one or more pilot signals are transmitted to a transceiver by the narrow-beam phased antenna array.

The time delay for at least one of the one or more pilot signals may be computed by the following formula:

$$\tau_i = \arg\max C_i(\tau)$$

wherein $\tau_i$ is the time delay estimate for an $i^{th}$ pilot signal, and $C_i(\tau)$ is defined as $C_i(\tau)=|\int r(t)s_i^*(t-\tau)dt|^2$, for $0<\tau<T$., wherein r(t) is an aggregate signal comprising the one or more pilot signals, $s_i^*(t-\tau)$ is a conjugate of the $i^{th}$ pilot signal delayed by $\tau$, and $\tau$ is a delay hypothesis.

The phase rotation for at least one of the one or more pilot signals may be computed by the following formula:

$$\phi_i = \measuredangle \int r(t) s_i^*(t-\tau_i)dt.$$

wherein $\phi_i$ is the phase estimate for an $i^{th}$ pilot signal, r(t) is the aggregate signal, $s_i^*(t\tau_i)$ is a conjugate of the $i^{th}$ pilot signal delayed by $\tau_i$, and $\tau_i$ is the time delay estimate.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
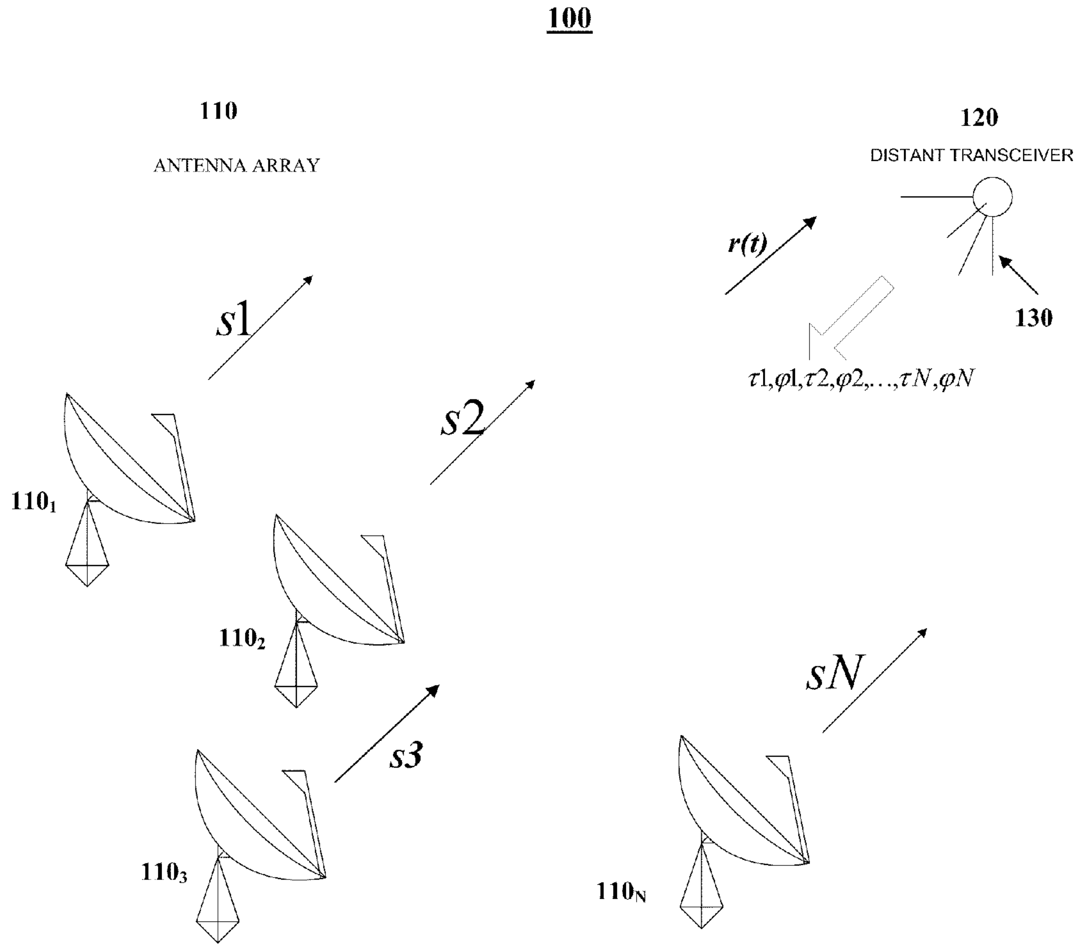
FIG. 1 is an illustrative embodiment of a system in accordance with an embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

An antenna is a device used for radiating or receiving electromagnetic waves. An antenna may be a dish antenna, which is typically a parabolically shaped antenna comprising at least a parabolic reflector used for radio, television, and/or data communications. The dish antenna may be used for satellite communication and broadcast reception, space communications, radio astronomy, and radar communications. For example, the dish antenna may be used to receive satellite television signals, or used by space agencies to communicate with satellites or deep-space probes. The dish antenna may be used for communications (e.g., uplink communications) with a distant object that is at line-of-sight or nearly so. A distant object may be an object that is far enough from the antenna that it may be impossible, inconvenient, and/or uneconomic to run a wire to it. The distant object may be in space or on the earth, and the dish antenna may communicate with the distant object via, for example, terrestrial microwave links, earth-satellite links, earth-spacecraft links, and/or other communication links. A space-based distant object may include, but not be limited to, a satellite, a deep-space probe, and/or other space-based distant objects. An earth-based/terrestrial communication link may include, but not be limited to, a microwave link used by: a telecom or other company to connect it's offices, an offshore oil platform to connect to its mainland office, a remote mountainous community to connect to a nearest town, a large construction project (perhaps a dam) far away from civilization to connect to a nearest town, and/or other links.

A beam of electromagnetic radiation having a narrow angular width/beamwidth of, for example, 0.1-1 degrees, is known as a pencil beam. A dish antenna may generate and/or emanate a pencil beam in the direction of a distant object to communicate with and/or transmit information to the distant object. A pencil beam at radio frequency of, for example, 0.1-10 GHz, may be generated by increasing the diameter of the dish antenna. This is because the beamwidth in radians equals approximately the inverse of the diameter of the dish antenna measured in wavelengths. The beamwidth relates to the dish antenna diameter based on the formula: Beamwidth in degrees=70*(wavelength in meters)/(diameter in meters). For example, a 5 GHz wave would require a dish diameter of 42 meters to achieve a 3-dB beamwidth of 0.1 degrees, while a 500 MHz wave would require a dish diameter of 420 meters to achieve the same beamwidth. However, there are practical limitations to this approach because a relatively large dish antenna is required to achieve a beamwidth of 0.1-1 degrees.

According to an embodiment, a plurality of small diameter (for example, less than 2 meters) dish antennas are spatially arranged and driven by varying electronic signals in such a way that the plurality of small diameter dish antennas co-operatively produce a pencil beam in the direction of the distant object. In other words, the plurality of small diameter dish antennas are spatially arranged and driven in a manner so as to simulate a large dish antenna with beamwidth about equal to the inverse of the diameter of the area over which the small antennas are spread. As such, the plurality of small diameter dish antennas behave in a manner indistinguishable from the large dish antenna. For a non-circular area, the diameter of the area over which the small antennas are spread may be defined as the arithmetic average of the distances between the two closest and the two farthest points on the perimeter. There is no restriction on how large the diameter of the area over which the small antennas are spread could be, as long as the small antennas can be controlled to transmit synchronously, as will be described in detail later herein.

The phases of the electronic signals transmitted by each of the plurality of small dish antennas may be adjusted so that the individual waves radiated from the antennas add constructively at a distance from the antennas (which may be referred to as co-phasing the transmitted signals), thereby achieving narrow beamwidth. As such, the antennas form a narrow-beam phased antenna array.

According to an embodiment, in order to align the phases of the plurality of small diameter dish antennas, each of the antennas may periodically transmit one or more mutually orthogonal pilot signals towards a distant transceiver of the distant object. Upon reception of the pilot signals, the distant transceiver determines the relative time delays and phases between the pilot signals transmitted by the antennas. The distant transceiver then transmits the values of the time delays and the phases back to the antennas. Using the just obtained time delays and phases, each of the antennas adjusts the transmit timing and phase of an information modulated signal such that the adjusted information modulated signals transmitted by each of the antennas combine to form a pencil beam and arrive co-phased at the distant transceiver. The information modulated signal may be a signal that carries one or more information streams that are to be communicated with the distant object. The information modulated signal may include, but not be limited to, commands to the distant object to perform certain functions, queries to the distant object to retrieve information, and/or other information modulated signals. Each pilot signal may have the same bandwidth as the information modulated signal that follows pilot transmission.

FIG. 1 is an illustrative embodiment of a system 100, in accordance with an embodiment. System 100 comprises a narrow-beam phased antenna array 110 and a distant transceiver 120 of a distant object. Narrow-beam phased antenna array 110 comprises plurality of small diameter dish antennas $\mathbf{110}_1$, $\mathbf{110}_2$, $\mathbf{110}_3$, . . . , $\mathbf{110}_N$. Each of the dish antennas $\mathbf{110}_1$, $\mathbf{110}_2$, $\mathbf{110}_3$, . . . , $\mathbf{110}_N$ is configured to periodically transmit one or more mutually orthogonal pilot signals s1, s2, s3, . . . , sN towards distant transceiver 120. Pilot signals s1, s2, s3, . . . , sN may be signals that are known to and pre-agreed upon by both antenna array 110 and distant transceiver 120. Distant transceiver 120 may have a pre-loaded copy of each of pilot signals s1, s2, s3, . . . , sN. Pilot signals s1, s2, s3, . . . , sN may have a common time duration. Pilot signals s1, s2, s3, . . . , sN being transmitted may traverse components of the transmit chains of the respective antennas $\mathbf{110}_1$, $\mathbf{110}_2$, $\mathbf{110}_3$, . . . , $\mathbf{110}_N$. The components may include, but not be limited to, encoders, modulators, up-converters, amplifiers, antennas, and/or other components. An example of mutually orthogonal signals could be Walsh codes. Almost orthogonal pilot signals, for example, pseudo-noise sequences with different offsets may also be used. One of ordinary skill in the art will recognize that other orthogonal pilot signals may also be used.

The duration between the periodic re-transmittals of pilot signals s1, s2, s3, . . . , sN to distant transceiver 120 may depend on the stationarity of the communication link (i.e., the duration for which the communication link may be considered as being unchanged) between antenna array 110 and distant transceiver 120. For example, in the case of a terrestrial microwave link or geo-stationary satellite link, the pilot signals may be re-transmitted every few hours to every 24 hours because these links are likely to remain stable for a few hours to one day. On the other hand, in case of a fast-moving (LEO or MEO) satellite or deep-space probe, the phases may need re-calibration every few minutes. Thus, the pilot signals may be transmitted every few minutes.

As shown in FIG. 1, the ith antenna of antenna array 110 transmits a pilot signal $s_i(t)$. Each of the antennas $\mathbf{110}_1$, $\mathbf{110}_2$, $\mathbf{110}_3$, . . . , $\mathbf{110}_N$ may transmit their respective pilot signals simultaneously. The pilot signals between every pair of antennas have the property that their cross-correlation, defined as $$\text{cross-correlation}=\int s_i(t)s_j^*(t)dt,$$

is zero or very small. Cross-correlation between $s_i(t)$ and $s_j(t)$ is very small when the cross-correlation is less than 5% of the energy of $s_i(t)$ and $s_j(t)$. The energy of $s_i(t)$ (which may be defined as $\int s_i(t)s_i^*(t)dt$) may be equal to energy of $s_j(t)$ (which may be defined as $\int s_j(t)s_j^*(t)dt$). In the above equation, the super-script denotes complex conjugation, and the integration is performed over the common time duration of the pilot signals. The cross-correlation may be small even if the signals $s_i(t)$ and $s_j(t)$ are translated in time (i.e., they do not begin at the same time instant) with respect to each other.

Both antenna array 110 and distant transceiver 120 have accurate clocks that allow them to synchronize transmission and reception of pilot signals s1, s2, s3, . . . , sN. A clock that is accurate to within 1% of the duration of every pilot signal may be defined as an accurate clock. Accuracy in clocks may be assured by ensuring that they have some common reference, for example, a GPS (global positioning system) signal. It may also be assured by the inherent accuracy of the timing mechanism, for example, atomic clocks that are known to be accurate may be employed.

In one embodiment, each antenna $\mathbf{110}_1$, $\mathbf{110}_2$, $\mathbf{110}_3$, . . . , $\mathbf{110}_N$ of antenna array 110 may generate and transmit its respective pilot signal s1, s2, s3, sN. It is noted that pilot signals may be denoted as s1, s2, . . . , sN or s1(t), s2(t), . . . , $s_N(t)$ interchangeably throughout the disclosure. In this case, each antenna may have an accurate clock to synchronize transmission of the pilot signals s1, s2, s3, . . . , sN. In one embodiment, a controller (not shown) may be coupled to each antenna $\mathbf{110}_1$, $\mathbf{110}_2$, $\mathbf{110}_3$, . . . , $\mathbf{110}_N$, wherein the controller generates and distributes the respective pilot signals to the antennas and the antennas transmit the received pilot signals. In this case, the controller may have an accurate clock to synchronize the distribution and hence the transmission of the pilot signals.

Pilot signals transmitted from each antenna $\mathbf{110}_1$, $\mathbf{110}_2$, $\mathbf{110}_3$, . . . , $\mathbf{110}_N$ of antenna array 110 may travel slightly different distances in order to reach distant transceiver 120. Distant transceiver 120 therefore receives an aggregate signal (denoted as r(t)) which equals a scaled sum of the pilot signals delayed and phase-rotated differentially. Phase rotation by, say angle $\phi$, may be defined as the process by which a transmitted pilot signal gets multiplied by $\exp(j\phi)$ (which equals $\cos(\phi)+j\sin(\phi)$, where j is the square-root of −1, and cos refers to the cosine, and sin refers to the sine of the angle $\phi$) by the time it reaches distant transceiver 120. The pilot signals transmitted by the antennas of the antenna array 110 may traverse different paths to reach distant transceiver 120. In other words, the multiple transmitted signals may each traverse a unique path. For each path traversed by the pilot signal, the phase of the pilot signal may be rotated by a different angle $\phi$. As such, differential phase rotation means that the phases of the pilot signals traversing different paths may be rotated by different angles $\phi$.

Distant transceiver 120 comprises at least one antenna element 130 that is configured to receive the aggregate signal. Because the pilot signals are pre-agreed upon, distant transceiver 120 may identify, from the aggregate signal received by distant transceiver 120, which antenna 110$_1$, 110$_2$, 110$_3$, . . . , 110$_N$ transmitted each individual pilot signal in the aggregate signal. The aggregate signal being received by distant transceiver 120 may traverse components of the receive chain of distant transceiver 120. The components may include, but not be limited to, antenna element, amplifier, down-converter, demodulator, decoder, and/or other components.

Distant transceiver 120 may comprise a processor (not shown) that is configured to compute a time delay experienced by each pilot signal in the received aggregate signal to provide a time delay estimate (denoted $\tau_i$ for the ith antenna) for the respective antenna of the antenna array 110 that transmitted the pilot signal. The processor may further be configured to compute a phase rotation experienced by each pilot signal in the received aggregate signal to provide a phase estimate (denoted $\phi_i$ for the ith antenna) for the respective antenna of the antenna array 110 that transmitted the pilot signal.

Distant transceiver 120 may compute the time delay experienced by the ith pilot signal $s_i(t)$ in the received aggregate signal as follows. Distant transceiver 120 may form for pilot signal $s_i(t)$, the function $C_i(\tau)$ defined as:

$$C_i(\tau)=|\int r(t)s_i^*(t-\tau)dt|^2, \text{ for } 0<\tau<T.$$

In the above equation, r(t) is the aggregate signal, $s_i^*(t-\tau)$ is a conjugate of the ith pilot signal $s_i(t)$ delayed by $\tau$, $\tau$ is the delay hypothesis, and the integration is carried out over the duration of the pilot signal $s_i(t)$. The range of $\tau$ varies from 0 (i.e., the start of pilot transmission) to a maximum time T that equals the approximate distance between antenna array 110 and distant transceiver 120 divided by the speed of light. For example, to evaluate the function $C_i(\tau)$, the following values may be tried as delay hypotheses 0, 0.05T, 0.1T, 0.15T, . . . 0.95T, T). Each of these values taken by $\tau$ is a "delay hypothesis" (in other words, it is hypothesized that the unknown and to-be-found value of the delay is one of 0, 0.05T, 0.1T, 0.15T, . . . 0.95T, T). If the distance is known accurately a much smaller range for $\tau$ may be used, consequently reducing computational load. For example, if the distance is known to within 10% accuracy then the search range for $\tau$ may be reduced to (0.9T, 1.1T). The distance may be known accurately in a variety of ways. For example, for earth-satellite links, the radius of the satellite's orbit may be determined prior to launch. If the antenna array and distant transceiver are at known latitude/longitude, then their distance may be known.

Of equal importance is the granularity of delay with which the function $C_i(\tau)$ is to be evaluated (i.e., distance between consecutive values of $\tau$ at which the function may be evaluated). Function $C_i(\tau)$ may be evaluated at values of $\tau$ that are no larger than half the inverse bandwidth of the pilot signal $s_i(t)$.

The time delay estimate for the ith antenna may then be determined as that value of $\tau$ that maximizes $C_i(\tau)$:

$$\tau_i=\arg\max C_i(\tau).$$

Following the time delay estimation, distant transceiver 120 may compute the phase rotation experienced by the ith pilot signal $s_i(t)$ in the received aggregate signal as follows. The phase rotation for the ith antenna may be determined as the phase of the cross-correlation between the received aggregate signal r(t) and the pilot signal $s_i(t)$ delayed by the computed time delay estimate $\tau_i$:

$$\phi_i=\measuredangle\int r(t)s_i^*(t-\tau_i)dt.$$

wherein $\phi_i$ is the phase estimate for an $i^{th}$ pilot signal $s_i(t)$, r(t) is the aggregate signal, $s_i^*(t-\tau_i)$ is a conjugate of the $i^{th}$ pilot signal $s_i(t)$ delayed by $\tau_i$ which is the time delay estimate.

As shown in FIG. 1, distant transceiver 120 may then transmit the time delay estimates τ1, τ2, . . . τN and the phase estimates (ϕ1, ϕ2, . . . , ϕN for each of the antennas 110$_1$, 110$_2$, 110$_3$, . . . 110$_N$ to antenna array 110. In one embodiment, the various time delay and phase estimates are transmitted simultaneously in one signal, two or more signals, or otherwise. In one embodiment, the time delay and phase estimates associated with each antenna (for example, τ1 and ϕ1 associated with antenna 110$_1$, . . . , and so forth) may be transmitted separately. All the $\tau$, $\phi$ values may reach the transmit array before the time when information is to be sent via the pencil beam. The interval between $\tau$, $\phi$ transmission updates may in general be shorter for a link that is less stationary. In the interest of bandwidth efficiency, it may be preferable that the fraction of time and bandwidth occupied by $\tau$, $\phi$ transmission not be greater than 1% of the total time and bandwidth available on the distant-transceiver-to-antenna-array link. The manner and sequence in which distant transceiver 120 transmits the time delay and phase estimates to the antenna array 110 is decided at design time, for example, by an engineer designing the system. This ensures that each antenna 110$_1$, 110$_2$, 110$_3$, . . . , 110$_N$ can identify which time delay and phase estimate applies to it. One of ordinary skill in the art will recognize that distant transceiver 120 may transmit the time delay and phase estimates in any manner or sequence which is pre-established during design time so as to allow the antennas to identify the respective time delay and phase estimates that apply to them. For example, a look-up table may be programmed into both distant transceiver 120 and each antenna "as a factory setting".

Following reception of the time delay and phase estimates by antenna array 110, antenna array 110 transmits an information modulated signal (denoted as m(t)) towards distant transceiver 120. In order for distant transceiver 120 to receive a pencil beam, the ith antenna transmits the signal m(t) shifted in time by $\tau$ and rotated in phase by $-\phi_i$. In other words, each antenna 110$_1$, 110$_2$, 110$_3$, . . . 110$_N$ adjusts the transmit timing and phase of the information modulated signal m(t) such that the adjusted information modulated signals transmitted by each of the antennas combine to form a pencil beam and arrive co-phased at the distant transceiver 120. In one embodiment, antenna array 110 transmits the information modulated signal when the time delay and phase estimates associated with each of the antennas 110$_1$, 110$_2$, 110$_3$, . . . , 110$_N$ are received.

Figure 2:
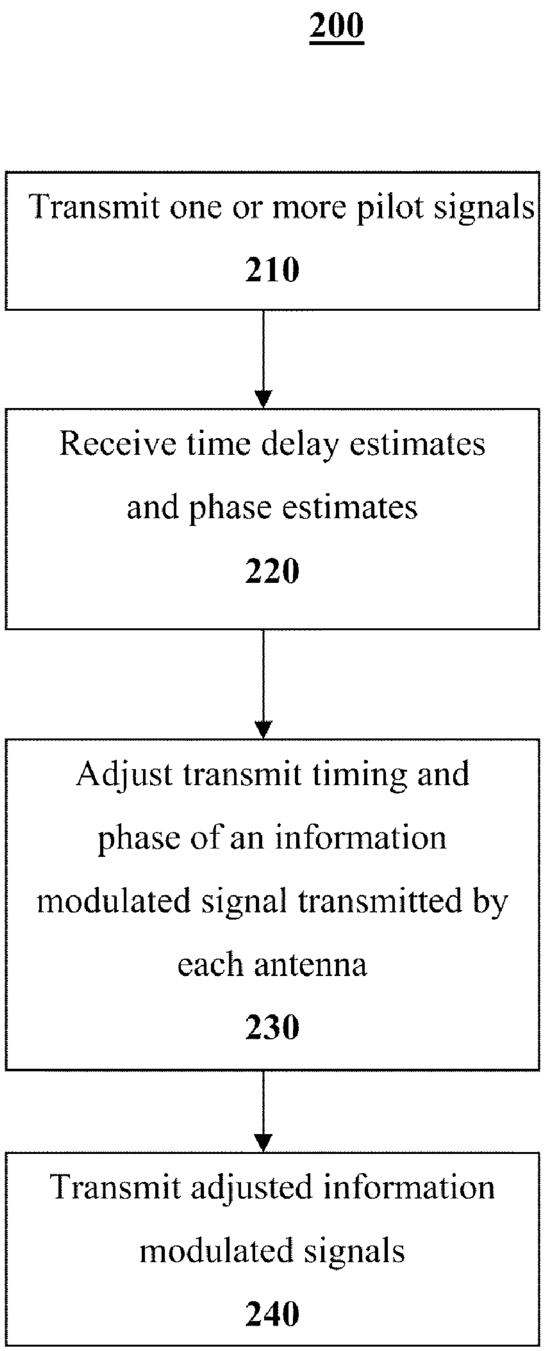
FIG. 2 depicts an illustrative embodiment of operations performed an antenna array, in accordance with an embodiment.

FIG. 2 depicts an example flowchart of operations performed by antenna array 110, in accordance with an embodiment. In operation 210, antenna array 110 may transmit one or more pilot signals towards distant transceiver 120. In one embodiment, each of the antennas 110$_1$, 110$_2$, 110$_3$, . . . , 110$_N$ of antenna array 110 may respectively transmit pilot signals s1, s2, s3, . . . , sN. In operation 220, antenna array 110 may receive the time delay estimates τ1, τ2, . . . τN and the phase estimates ϕ1, ϕ2, . . . , ϕN for each of the antennas 110$_1$, 110$_2$, 110$_3$, . . . , 110$_N$, which are transmitted to antenna array 110 by distant transceiver 120.

Following reception of the time delay and phase estimates by antenna array 110, antenna array 110 transmits an information modulated signal towards distant transceiver 120. In operation 230, each antenna 110$_1$, 110$_2$, 110$_3$, . . . , 110$_N$ adjusts the transmit timing and phase of the information modulated signal based on the received time delay and phase estimates associated with the respective antenna. In operation 240, the adjusted information modulated signals are transmitted by each of the antennas. In other words, each antenna transmits the information modulated signal that is shifted in time by the respective time delay estimate and phase rotated by the respective phase estimate. These adjusted information modulated signals combine to form a pencil beam and arrive co-phased at the distant transceiver 120.

Figure 3:
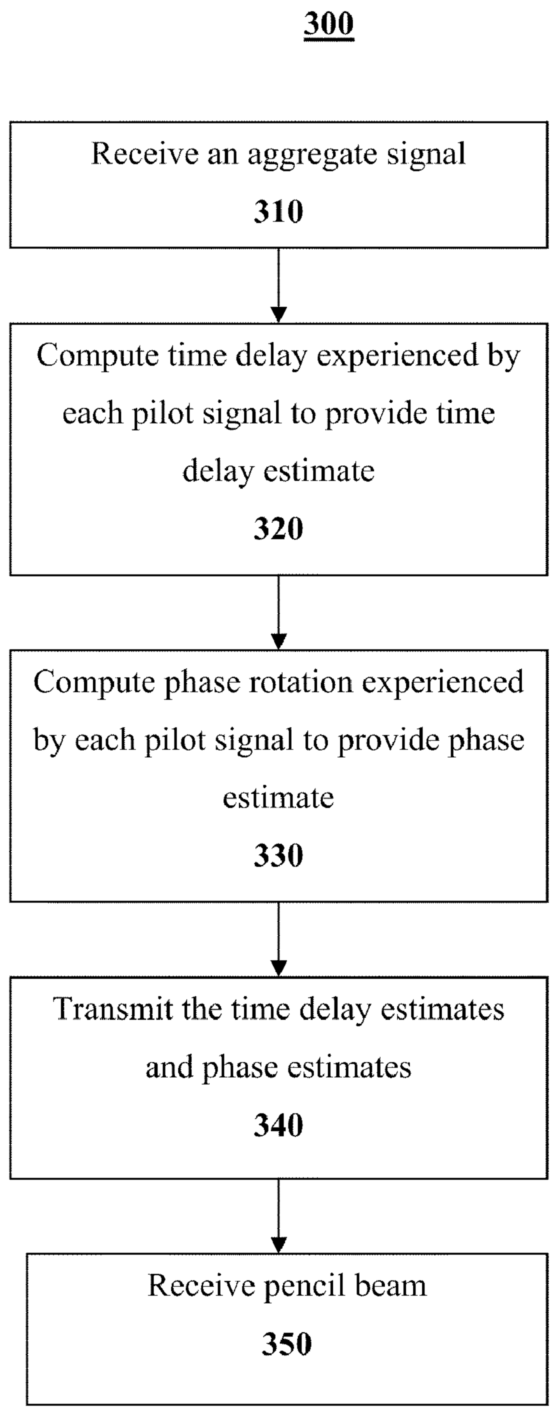
FIG. 3 depicts an illustrative embodiment of operations performed by a distant transceiver, in accordance with an embodiment.

FIG. 3 depicts an exemplary flowchart of operations performed by distant transceiver 120, in accordance with an embodiment. In operation 310, distant transceiver 120 receives an aggregate signal comprising one or more pilot signals that are transmitted to distant transceiver by antenna array 110. The aggregate signal may comprise a scaled sum of the pilot signals s1, s2, s3, . . . , sN delayed and phase-rotated differentially.

In operation 320, distant transceiver 120 may compute a time delay experienced by each pilot signal in the received aggregate signal to provide a time delay estimate for the respective antenna of the antenna array 110 that transmitted the pilot signal. In operation 330, distant transceiver may compute a phase rotation experienced by each pilot signal in the received aggregate signal to provide a phase estimate for the respective antenna of the antenna array 110 that transmitted the pilot signal. In operation 340, distant transceiver may transmit the time delay estimates τ1, τ2, . . . , TN and the phase estimates ϕ1, ϕ2, . . . , ϕN for each of the antennas 110$_1$, 110$_2$, 110$_3$, . . . 110$_N$ to antenna array 110. In operation 350, distant transceiver may receive a pencil beam emanated by antenna array 110 that is formed by the adjusted information modulated signals transmitted by each antenna of antenna array 110.

Figure 4:
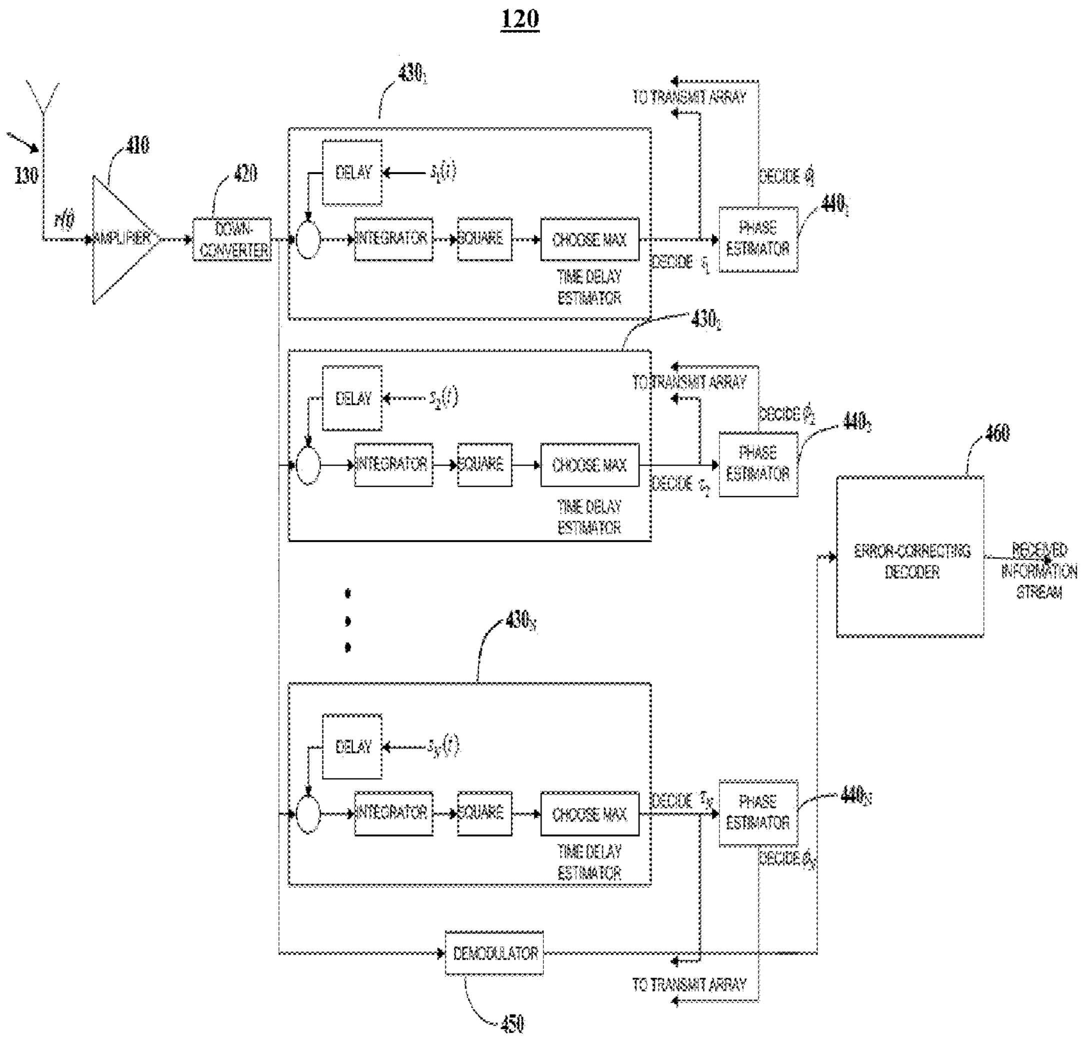
FIG. 4 is an illustrative embodiment a distant transceiver of a distant object, in accordance with an embodiment.

FIG. 4 is block diagram of distant transceiver 120 of the distant object, in accordance with an embodiment. Distant transceiver 120 may comprise at least one antenna element 130 that may be configured to receive aggregate signal r(t) which equals a scaled sum of the pilot signals delayed and phase-rotated differentially. For each pilot signal in the aggregate signal r(t), the aggregate signal traverses through various components of the receive chain of distant transceiver 120. Typically, the components may comprise, but not be limited to, antenna element, amplifier, down-converter, demodulator, decoder, and/or other components. According to an embodiment, distant transceiver 120 may, in addition to these components, comprise time delay estimators and phase estimators associated with each pilot signal in the received aggregate signal.

The processing of received aggregate signal r(t) will be described with respect to pilot signal $s_1(t)$ transmitted by antenna 110$_1$, which traverses components 410, 420, 430$_1$, and 440$_1$ shown in FIG. 4. It will be understood that this description similarly applies to the processing of aggregate signal r(t) with respect to other pilot signals s2(t), . . . , $s_N(t)$, transmitted by the other antennas 110$_2$, . . . , 110$_N$. The received aggregate signal r(t) may be amplified by low-noise amplifier 410. The amplified signal may be down-converted by down-converter 420. The down-converted signal may be fed into N time delay estimators 430$_1$, 430$_2$, . . . , 430$_N$ that compute time delays experienced by pilot signal $s_1(t)$, s2(t), . . . , $s_N(t)$, respectively.

For pilot signal $s_1$ (t), for example, the down-converted signal from down-converter 420 may be fed to time delay estimator 430$_1$. Time delay estimator 430$_1$ may compute a time delay experienced by pilot signal $s_1(t)$ to provide a time delay estimate τ1 for antenna 110$_1$ that transmitted the pilot signal $s_1(t)$. The computed time delay estimate τ1 is provided to phase estimator 440$_1$. Phase estimator 440$_1$ may compute a phase rotation experienced by pilot signal $s_1(t)$ to provide a phase estimate ϕ1 for antenna 110$_1$ that transmitted the pilot signal $s_1(t)$.

Time delay estimator 430$_1$ may perform the time delay estimation for pilot signal $s_1(t)$ based on the formulas/functions $C_i(\tau)=|\int r(t)s_i^*(t-\tau)dt|^2$, for $0<\tau<T$. and $\tau_i=\arg\max C_i(\tau)$ described above. For the pilot signal $s_1(t)$, i=1 in these formulas. One of ordinary skill will readily appreciate that time delay estimator may perform delaying, summing, integration, squaring, and choose max operations/computations (performed by, for example, delay, summer, integrator, square, and choose max components depicted in time delay estimator 430$_1$ in FIG. 4) to provide the time delay estimate τ1 for antenna 110$_1$.

Phase estimator 440$_1$ may perform the phase estimation for pilot signal $s_1(t)$ based on the formula/function $\phi_i=\measuredangle\int r(t)s_i^*(t-\tau_i)dt$. described above. For the pilot signal $s_1(t)$, i=1 in this formula.

Figure 5:
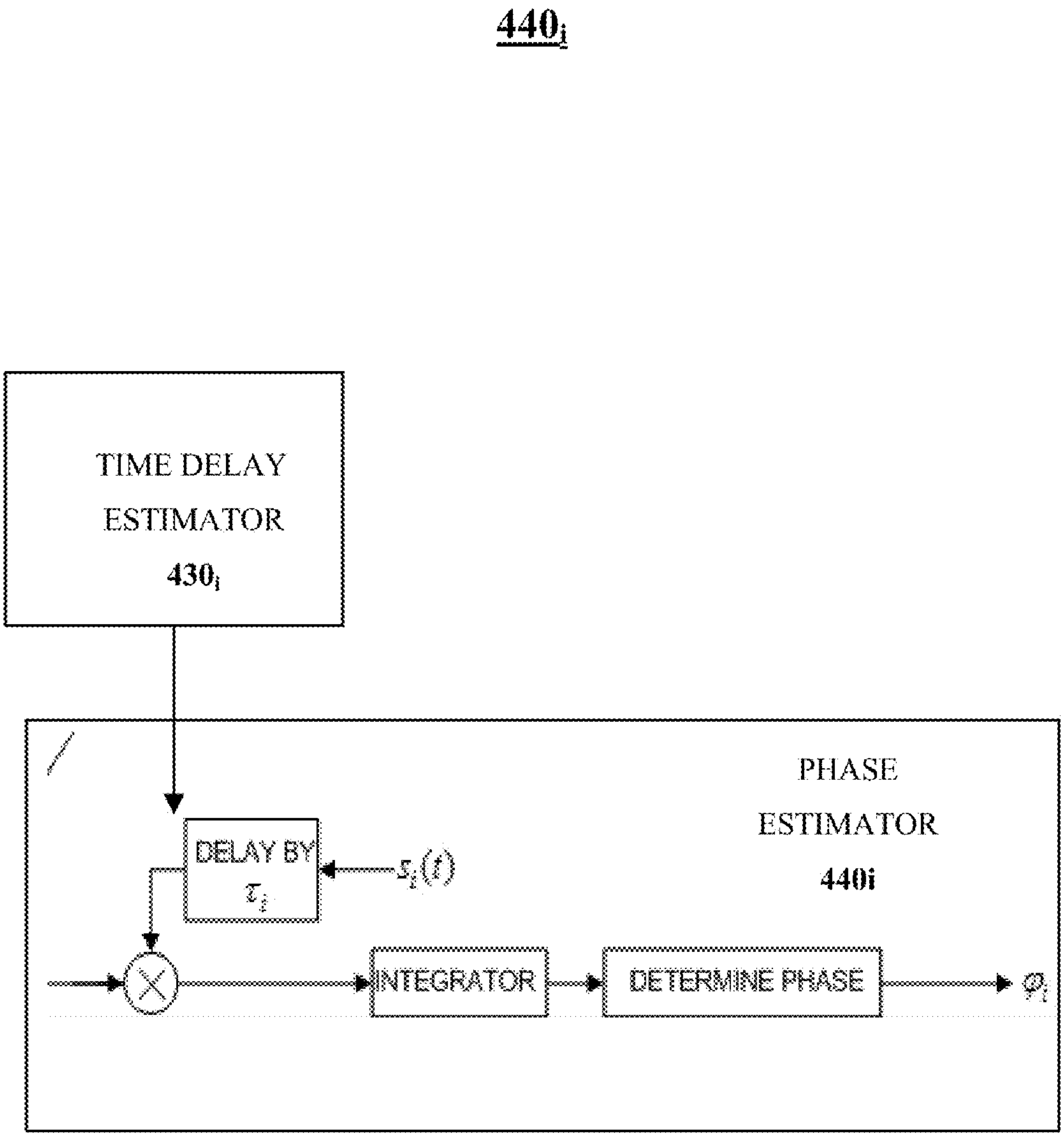
FIG. 5 is an illustrative embodiment of a phase estimator of a distant transceiver, in accordance with an embodiment.

FIG. 5 is schematic depiction of phase estimator 440$_i$, that may compute a phase rotation experienced by pilot signal $s_i(t)$ to provide a phase estimate $\phi_i$ for antenna 110$_i$ that transmitted the pilot signal $s_i(t)$. Phase estimator 440$_i$, may receive time delay estimate $\tau_i$ from time delay estimator 430$_i$. The phase estimator may perform delaying, summing, integration, and phase determination operations/computations (performed by, for example, delay, summer, integrator, and determine phase components depicted in phase estimator 440$_i$, in FIG. 5) to provide the phase estimate $\phi_i$ for antenna 110$_i$.

As such, the time delay estimates and phase estimates for antennas 110$_2$, . . . , 110$_N$ are similarly determined. Distant transceiver 120 may then transmit the time delay estimates τ1, τ2, . . . τN and the phase estimates ϕ1, ϕ2, ϕN for each of the antennas 110$_1$, 110$_2$, 110$_3$, . . . 110$_N$ to antenna array 110. The time delay and phase estimates being transmitted may traverse components of the transmit chain of distant transceiver 120. The components may include, but not be limited to, encoder, modulator, up-converter, amplifier, antenna element, and/or other components. These estimates may be received by antenna array 100 and may traverse components of the receive chains of the respective antennas 110$_1$, 110$_2$, 110$_3$, . . . , 110$_N$. The components may include, but not be limited to, antennas, amplifiers, down-converters, demodulators, decoders, and/or other components.

Following reception of the time delay and phase estimates by antenna array 110, antenna array 110 transmits an information modulated signal towards distant transceiver 120. In order for distant transceiver 120 to receive a pencil beam, the ith antenna transmits the information modulated signal shifted in time by $\tau_i$ and rotated in phase by $-\phi_i$. In other words, distant transceiver 120 may receive a pencil beam emanated by antenna array 110 that is formed by the adjusted information modulated signals transmitted by each antenna of antenna array 110. Each antenna of the antenna array may transmit a single and common information-modulated signal, except each antenna does so with differing delays and phases.

Antenna element 130 of distant transceiver 120 may receive the pencil beam. The received pencil beam is amplified by low-noise amplifier 410. The amplified pencil beam is down-converted by down-converter 420. The down-converted pencil beam may be fed to demodulator 450. The demodulator may demodulate the information modulated signal. The demodulated signal from the demodulator may be fed to error-correcting decoder 460 that decodes the demodulated signal to obtain the received information stream.

According to an embodiment, distant transceiver 120 may include a processor (not shown) that is configured to compute the time delay and the phase rotation experienced by each pilot signal to provide time delay and phase estimates for the respective antenna. In one embodiment, the processor may perform the functions of the time delay estimator and the phase estimator. It will be understood that while various components of the distant transceiver are depicted as separate components, they may be combined in a single processor of distant transceiver 120.

According to an embodiment, distant transceiver may include and/or otherwise be associated with a memory device. The memory device may include software/programs that are arranged to perform the various functions, operations, computations, estimations, etc., as described herein. The memory device may include, or otherwise be associated with, one or more computer readable tangible mediums that may be configured to store computer executable instructions that when executed by the processor may cause the processor to perform the various operations, estimations, and/or functions described herein. System memory, removable storage, and non-removable storage are all examples of computer readable tangible media/computer storage media. Computer storage media includes, but is not limited to, RAM, ROM, EEPROM, flash memory, or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the processor.

Figure 6:
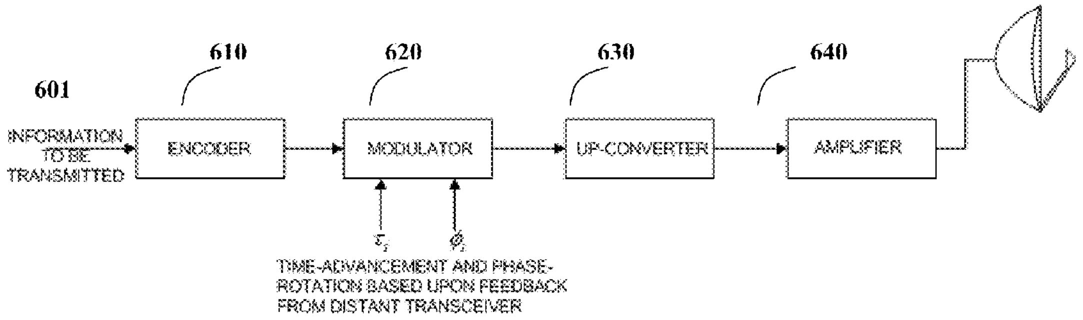
FIG. 6 is an illustrative embodiment of a transmit chain associated with an antenna of antenna array 110 for transmitting information modulated signals, in accordance with an embodiment.

FIG. 6 is block diagram of a transmit chain associated with an ith antenna 110, of antenna array 110 for transmitting information modulated signals, in accordance with an embodiment. Information stream 601 to be transmitted to distant transceiver 120 is provided to encoder 610 that encodes the information stream. The encoded information stream may be provided to modulator 620. Modulator 620 may also be provided with the time delay estimate $\tau_i$ and the phase estimate $\phi_i$ associated with the respective antenna 110$_i$, which are received from distant transceiver 120. Modulator 620 modulates the encoded information stream to generate an information modulated signal. In one embodiment, modulator 620 may delay the generation of the information modulated signal based on the time delay estimate $\tau_i$. Modulator 620 may rotate the phase of the information modulated signal based on the phase estimate $\phi_i$. In one embodiment, modulator 620 may comprise a phase adjuster that rotates the phase of the information modulated signal based on the phase estimate $\phi_i$. As such, modulator 620 may generate an information modulated signal that is shifted in time by the time delay estimate $\tau_i$ and phase rotated by the phase estimate $\phi_i$. The information modulated signal that is delayed by $\tau_i$ and rotated in phase by $-\phi_i$ is provided to up-convertor 630 that up-coverts the information modulated signal. The up-converted information modulated signal is amplified by amplifier 640. The amplified information modulated signal is then transmitted by antenna 110$_i$, of antenna array 110.

It will be recognized that the description of FIG. 6 applies to each antenna 110$_1$, 110$_2$, 110$_3$, . . . , 110$_N$. In other words, each antenna 110$_1$, 110$_2$, 110$_3$, . . . , 110$_N$ performs similar processing on the information stream 601 as described in FIG. 6. As such, each antenna 110$_1$, 110$_2$, 110$_3$, . . . 110$_N$ adjusts the transmit timing and phase of the information modulated signal based on their respective time delay and phase estimates such that the adjusted information modulated signals transmitted by each of the antennas combine to form a pencil beam and arrive co-phased at the distant transceiver 120.

In one embodiment, antenna 110, may be coupled to an accurate clock (not shown) and modulator 620 may monitor the clock. When the clock strikes time $\tau_i$, modulator 620 may commence the generation of the information modulated signal. In one embodiment, antenna 110, may be coupled to a controller (not shown), wherein the controller generates and distributes a timing signal to the modulator 620. In this case, the controller may have an accurate clock to generate and distribute the timing signal at time $\tau_i$. Modulator 620 may accordingly start the generation of the information modulated signal at time $\tau_i$.

According to an embodiment, while various components of the antenna array and/or each antenna are depicted as separate components, they may be combined in a single processor coupled and/or otherwise associated with the antenna array. According to an embodiment, the antenna array and/or each antenna may include and/or otherwise be associated with a memory device. The memory device may include software/programs that are arranged to perform the various functions, operations, computations, estimations, etc., as described herein. The memory device may include, or otherwise be associated with, one or more computer readable tangible mediums that may be configured to store computer executable instructions that when executed by the processor may cause the processor to perform the various operations, estimations, and/or functions described herein. System memory, removable storage, and non-removable storage are all examples of computer readable tangible media/computer storage media. Computer storage media includes, but is not limited to, RAM, ROM, EEPROM, flash memory, or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the processor.

In any event, adjusting the transmit timing and the phase of the information modulated signals transmitted by antennas 110$_1$, 110$_2$, 110$_3$, . . . 110$_N$ ensures that they arrive synchronously and co-phased at distant transceiver 120, and combine to form a pencil beam in the direction of distant transceiver 120.

Such a pencil beam is useful because it concentrates radio energy contained in the beam emanating from antenna array 110 in the direction of the distant object, thereby increasing data-throughput, reliability, and transmission security for the intended recipient, while reducing interference for any other objects.

In an embodiment, utilizing a plurality of small dish antennas and driving them by varying information modulated signals (e.g., varied based on time delay and phase estimates) to co-operatively produce a pencil beam in the direction of the distant object provides increased data-throughput of the communication link between antenna array 110 and distant transceiver 120 due to the highly directed nature of the pencil beam. This highly directed nature of the pencil beam also ensures that the information is not received by unintended recipients, thereby increasing transmission security.

Even if one or more of the small dish antennas were to fail, the communication link would still be maintained because the remaining functioning antennas may be able to carry the information, although at a lower data rate. If a single large antenna fails then the entire communication link can be destroyed. As such, the arrangement described herein may provide more reliable communication links as compared to a single large antenna.

A single large dish antenna can weigh many tons. It's physical extent could invite problems like wind load, etc. A large number of expensive structural and civil elements would be necessary to hold the large antenna in place. In an embodiment, instead of a single dish, a plurality of small dish antennas may be used where each would require lesser and cheaper civil infrastructure, thereby reducing the overall cost and complexity of the system without loss in performance.

The plurality of small dish antennas may be spatially arranged in some arbitrary and three-dimensional way in the area over which the small antennas are spread. There is also no requirement that these antennas lie on a flat surface. By following the operations described, for example in FIGS. 2 and 3, the antennas may still be able to co-operatively provide a pencil beam, regardless of their placement in the area.

If the distant object with which communication is being performed moves an angular distance smaller than the beamwidth of any of the constituent dish antennas, then the pencil beam emanating from the antenna array may be electronically steered towards the new position of the distant object by merely re-calibrating the phases of the constituent dish antennas. In one embodiment, a determination of whether the distant object has moved is based on the quality of the communication link. For example, if the quality of the link deteriorates, a determination is made that the distant object has moved. A determination that the distant object has moved may trigger the various operations described herein, for example, with respect to FIGS. 2 and 3. This would result in the re-adjusting of the phases of each antenna such that the pencil beam in now emanated in the direction of the new position of the distant object. In other words, the pencil beam is steered towards the new position of the distant object.

In one embodiment, each of the small antennas may be coupled to a switching controller that selectively activates or de-activates the antennas. By such selective activation or de-activation of the antennas, the beamwidth may be contracted or expanded. The beamwidth is inversely proportional to the diameter of the area over which the small antennas are spread. Thus, by de-activating (turning off), for example, an outer ring of the small antennas, the diameter of the area over which the antennas are spread is made smaller, thereby expanding beamwidth.

In one embodiment, the beamwidth is expanded to first locate a distant object in a large angular space and enable communication with the distant object at a low bit-rate. Then, using various operations described herein, for example, with respect to FIGS. 2 and 3, the time delay and phase estimates for each of the antennas may be determined and applied to information modulated signals transmitted by the antennas $\mathbf{110}_1$, $\mathbf{110}_2$, $\mathbf{110}_3$, . . . $\mathbf{110}_N$ to form a pencil beam in the direction of distant object.

This capability of partially activating/de-activating a subset of small dish antennas to contract/expand beamwidth is not available for a single large dish antenna because the large antenna may either be fully on or fully off.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A transceiver, comprising:

at least one antenna element configured to receive an aggregate signal comprising one or more pilot signals; and a processor configured to compute a time delay experienced by at least one of the one or more pilot signals to provide a time delay estimate, and compute a phase rotation experienced by at least one of the one or more pilot signals to provide a phase estimate, wherein the time delay for at least one of the one or more pilot signals is computed by the following formula:

$$\tau_i = \arg\max C_i(\tau),$$

wherein $\tau_i$, is the time delay estimate for an $i^{th}$ pilot signal, and $C_i(\tau)$ is defined as $C_i(\tau)=|\int r(t)s_i^*(t-\tau)dt|^2$, for $0<\tau<T.$, wherein r(t) is the aggregate signal, $s_i^*(t-\tau)$ is a conjugate of the $i^{th}$ pilot signal delayed by $\tau$, and $\tau$ is a delay hypothesis.

2. The transceiver of claim 1, wherein the at least one antenna element is configured to transmit the time delay estimate and the phase estimate to a narrow-beam phased antenna array, wherein the one or more pilot signals are transmitted to the transceiver by the narrow-beam phased antenna array.

3. The transceiver of claim 1, wherein the phase rotation for at least one of the one or more pilot signals is computed by the following formula:

$$\phi_1 = \measuredangle \int r(t)s_i^*(t-\tau_i)dt.$$

wherein $\phi_1$ is the phase estimate for an $i^{th}$ pilot signal, r(t) is the aggregate signal, $s_i^*(t-\tau_i)$ is a conjugate of the $i^{th}$ pilot signal delayed by $\tau_i$, and $\tau_i$ is the time delay estimate.

4. The transceiver of claim 1, wherein the one or more pilot signals comprise one or more mutually orthogonal pilot signals.

5. A narrow-beam phased antenna array, comprising:

a plurality of antennas, at least one of the plurality of antennas configured to transmit one or more pilot signals, at least a portion of the antennas comprising parabolic reflectors;

wherein, at least one antenna of the plurality of antennas is configured to receive a time delay estimate defining a time delay experienced by at least one of the one or more pilot signals transmitted by the at least one antenna, and a phase estimate defining a phase rotation experienced by at least one of the one or more pilot signals transmitted by the at least one antenna, the time delay for at least one of the one or more pilot signals is computed by the following formula:

$$\tau_i = \arg\max C_i(\tau),$$

wherein $\tau_i$ is the time delay estimate for an $i^{th}$ pilot signal, and $C_i(\tau)$ is defined as $C_i(\tau)=|\int r(t)s_i^*(t-\tau)dt|^2$, for $0<\tau<T.$, wherein r(t) is the aggregate signal, $s_i^*(t-\tau)$ is a conjugate of the $i^{th}$ pilot signal delayed by $\tau$, and $\tau$ is a delay hypothesis; and wherein the at least one antenna is configured to transmit an information modulated signal that is shifted in time by the time delay estimate and phase rotated by the phase estimate.

6. The narrow-beam phased antenna array for claim 5, further comprising:

a modulator associated with the at least one of the plurality of antennas, wherein the modulator is configured to generate the information modulated signal that is shifted in time by the time delay estimate and phase rotated by the phase estimate.

7. The narrow-beam phased antenna array of claim 5, further comprising:

a switching controller coupled to at least one of the plurality of antennas, the switching controller configured to selectively activate or de-activate the antennas.

8. The narrow-beam phased antenna array of claim 5, further comprising:

each of the plurality of antennas configured to receive the time delay estimate defining the time delay experienced by each of the one or more pilot signals transmitted by a corresponding antenna, and the phase estimate defining the phase rotation experienced by each of the one or more pilot signals transmitted by the corresponding antenna; and each of the plurality of antennas configured to transmit the information modulated signal that is shifted in time by the time delay estimate for each corresponding antenna and phase rotated by the phase estimate for each corresponding antenna.

9. The narrow-beam phased antenna array of claim 8, wherein the information modulated signal transmitted by the plurality of antennas combines to form a beam.

10. The narrow-beam phased antenna array of claim 5, wherein the one or more pilot signals comprise one or more mutually orthogonal pilot signals.

11. The narrow-beam phased antenna array for claim 6, further comprising:

an encoder associated with the at least one of the plurality of antennas, wherein the encoder is configured to encode an information stream to be transmitted to form an encoded information stream.

12. The narrow-beam phased antenna array for claim 11, wherein the modulator is configured to modulate the encoded information stream to form the information modulated signal.

13. A method, comprising:

receiving an aggregate signal comprising one or more pilot signals;

computing a time delay experienced by at least one of the one or more pilot signals to provide a time delay estimate; and computing a phase rotation experienced by at least one of the one or more pilot signals to provide a phase estimate, wherein the time delay for at least one of the one or more pilot signals is computed by the following formula:

$$\tau_i = \arg\max C_i(\tau),$$

wherein $\tau_i$ is the time delay estimate for an $i^{th}$ pilot signal, and $C_i(\tau)$ is defined as $C_i(\tau)=|\int r(t)s_i^*(t-\tau)dt|^2$, for $0<\tau<T$., wherein r(t) is the aggregate signal, $s_i^*(t-\tau)$ is a conjugate of the $i^{th}$ pilot signal delayed by $\tau$, and $\tau$ is a delay hypothesis.

14. The method of claim 13, further comprising:

transmitting the time delay estimate and the phase estimate to a narrow-beam phased antenna array, wherein the one or more pilot signals are transmitted to a transceiver by the narrow-beam phased antenna array.

15. The method of claim 13, wherein the phase rotation for at least one of the one or more pilot signals is computed by the following formula:

$$\phi_1 = \sphericalangle \int r(t)s_i^*(t-\tau_i)dt.$$

wherein $\phi_1$, is the phase estimate for an $i^{th}$ pilot signal, r(t) is the aggregate signal, $s_i^*(t-\tau_i)$ is a conjugate of the $i^{th}$ pilot signal delayed by $\tau_i$, and $\tau_i$ is the time delay estimate.

16. The method of claim 13, wherein the one or more pilot signals comprise one or more mutually orthogonal pilot signals.

17. A transceiver, comprising:

at least one antenna element configured to receive an aggregate signal comprising one or more pilot signals; and a processor configured to compute a time delay experienced by at least one of the one or more pilot signals to provide a time delay estimate, and compute a phase rotation experienced by at least one of the one or more pilot signals to provide a phase estimate, wherein the phase rotation for at least one of the one or more pilot signals is computed by the following formula:

$$\phi_1 = \sphericalangle \int r(t)s_i^*(t-\tau_i)dt.$$

wherein $\phi_1$ is the phase estimate for an $i^{th}$ pilot signal, r(t) is the aggregate signal, $s_i^*(t-\tau_i)$ is a conjugate of the $i^{th}$ pilot signal delayed by $\tau_i$, and $\tau_i$ is the time delay estimate.

18. A method, comprising:

receiving an aggregate signal comprising one or more pilot signals;

computing a time delay experienced by at least one of the one or more pilot signals to provide a time delay estimate; and computing a phase rotation experienced by at least one of the one or more pilot signals to provide a phase estimate, wherein the phase rotation for at least one of the one or more pilot signals is computed by the following formula:

$$\phi_1 = \sphericalangle \int r(t)s_i^*(t-\tau_i)dt.$$

wherein $\phi_1$, is the phase estimate for an $i^{th}$ pilot signal, r(t) is the aggregate signal, $s_i^*(t-\tau_i)$ is a conjugate of the $i^{th}$ pilot signal delayed by $\tau_i$, and $\tau_i$ is the time delay estimate.

* * * * *

UNITED STATES PATENT AND TRADEMARK OFFICE

CERTIFICATE OF CORRECTION

PATENT NO. : 8,224,261 B2
APPLICATION NO. : 12/620110
DATED : July 17, 2012
INVENTOR(S) : Keerthi It is certified that error appears in the above-identified patent and that said Letters Patent is hereby corrected as shown below:

In the Specification

In Column 3, Line 52, delete "$s_i$ *($t\tau_i$)" and insert -- $s_i$ *($t-\tau_i$) --, therefor.

In Column 6, Line 37, delete "denotes" and insert -- * denotes --, therefor.

In Column 6, Line 54, delete "s3, sN." and insert -- s3, . . ., sN. --, therefor.

In Column 8, Line 26, delete "(ϕ1," and insert -- ϕ1, --, therefor.

In Column 8, Line 59, delete "τ" and insert -- $\tau_i$ --, therefor.

In Column 10, Line 36, delete "$440_{i,}$" and insert -- $440_i$ --, therefor.

In Column 10, Line 39, delete "$440_{i,}$" and insert -- $440_i$ --, therefor.

In Column 11, Line 46, delete "110," and insert -- $110_i$ --, therefor.

In Column 12, Line 4, delete "$110_{i,}$" and insert -- $110_i$ --, therefor.

In Column 12, Line 16, delete "110," and insert -- $110_i$ --, therefor.

In Column 12, Line 20, delete "110," and insert -- $110_i$ --, therefor.

In the Claims

In Column 16, Line 34, in Claim 6, delete "for" and insert -- of --, therefor.

In Column 16, Line 66, in Claim 11, delete "for" and insert -- of --, therefor.

In Column 17, Line 5, in Claim 12, delete "for" and insert -- of --, therefor.

Signed and Sealed this
Eighteenth Day of June, 2013

Teresa Stanek Rea

Teresa Stanek Rea
*Acting Director of the United States Patent and Trademark Office*